3,223,672
POLYURETHANE SOLUTION AND METHOD OF MAKING SAME
Lester Edward Schniepp, Barrington, Ill., assignor to American Can Company, New York, N.Y., a corporation of New Jersey
No Drawing. Filed Dec. 28, 1960, Ser. No. 78,809
14 Claims. (Cl. 260—32.4)

The present invention relates to stable solutions of polyester urethanes in organic solvents and the method of making such solutions. More particularly, it pertains to relatively high solids, stable, fluid solutions of polyester urethanes in organic solvents from which films of solid polyester urethanes may be economically cast and the method of making such solutions.

The formation of relatively high molecular weight, i.e. 10,000 or above, polyester urethane resins by the inter-reaction of polyesters and diisocyanates and the desirable properties of these resins, such as strength and inertness, are known in the art.

Solutions of these resins in organic solvents are also known in the art. However, these prior art polyester urethane solutions have achieved their solids content by using expensive solvents such as dimethyl formamide and tetrahydrofuran.

It is therefore an object of the instant invention to provide a fluid solution containing a relatively high percentage of polyester urethane resin in a common solvent.

Another object is to provide a fluid solution of polyester urethane resin in a common organic solvent from which films, layers, or coatings of the urethane resin may be relatively inexpensively produced.

A further object is to provide a fluid solution containing a relatively high percentage of polyester urethane resin dissolved in a common solvent, which solution has a viscosity making it suitable for the relatively easy production of films, coatings, and layers of solid urethane resin.

Yet another object is to provide a solution containing a relatively high percentage of a polyester urethane resin dissolved in a common solvent which is fluid not only upon its production but remains in the same condition over an extended period of time.

Still a further object is to provide a method by which relatively high solids, low viscosity, fluid solutions of polyester urethane resin in common solvents may be produced.

Numerous other objects and advantages of the invention will be apparent as it is better understood from the following description, which discloses a preferred embodiment thereof.

The above objects are accomplished by inter-reacting a diisocyanate and a polyester in an anhydrous aromatic solvent to form a polyester urethane resin in situ and thereafter adding a polar solvent to maintain the urethane resin in a stable fluid solution.

Polyester resins utilized in the present invention are the reaction product of a dihydroxy alcohol and a dicarboxylic acid in a mol ratio of at least 1.1, and preferably about 1.2, alcohol to acid. For the purpose of the present invention, an excess of the alcohol is necessary to produce a polyester substantially each molecule of which has terminal hydroxyl groups. For this reason, any excess of alcohol over the acid may be used. However, since before the polyester can be reacted with the diisocyanate any excess of unreacted alcohol must be removed, it is desired to maintain this excess of alcohol over acid at a minimum. The resulting polyester has an average molecular weight of 1500 to 3000, and preferably about 2000; has an equivalent weight based on the reactive terminal hydroxyl group of from 750 to 1500, and preferably about 1000; and has an acid number of less than 10, and preferably less than 5.

These polyesters are aliphatic, being formed from an aliphatic dicarboxylic acid having an alkylene group of from 6 to 10 carbon atoms and an aliphatic dihydroxy alcohol having an alkylene group of from 2 to 4 carbon atoms. Specific acids within this definition are adipic acid, pimelic acid, suberic acid, azelaic acid, and sebacic acid. Specific alcohols within the above definition are alkylene glycols such as ethylene glycol, propylene glycol, and butylene glycol. From the above groups, sebacic acid and ethylene glycol are preferred as the reactants forming the polyester.

The polyester may be formed in any manner well known in the art. For example: The acid and the glycol are combined in the desired proportions and heated to liquify the solid reactants and form a liquid reaction mass. This heating is continued until the theoretical amount of water resulting from the esterification is distilled off. The pressure within the reaction flask is then reduced to distill off any excess glycol, after which heating is continued at the reduced pressure to increase the molecular size and weight of the ester and to reduce the acid number of the reaction mass. This heating is continued until a polyester of the desired molecular weight and acid number is formed.

The diisocyanates useful in the instant invention are aromatic diisocyanates having either single or condensed hydrocarbon aromatic rings. Specific diisocyanates within this definition are the 2,4- and 2,6-tolylene diisocyanate, 4,4'-diphenylmethane diisocyanate, and 1,5-naphthylene diisocyanate. Preferred for use in the instant invention is the 4,4'-diphenylmethane diisocyanate.

In the formation of the polyester urethane resin of the instant invention, it is desirable to have as complete a reaction as possible only between the diisocyanate and the polyester resin. To this end, it is necessary that no moisture be present in the polyester or the organic solvent. This result may be obtained by any means well known in the art, such as heating the polyester under vacuum or distilling the solution of polyester in organic solvent to remove any water therefrom. The reactants are then combined in a mol ratio of 0.9 to 1.1 and preferably 1.0 mol of diisocyanate per mol of polyester. It has been found that ratios above the designated range cause the resulting solutions to gel upon standing for a week or more. On the other hand, a ratio below the specified range produces a solid polyurethane resin which has relatively low cohesive strengths.

The aromatic solvent used in the present invention is a hydrocarbon of the benzene series having an atmospheric pressure boiling point below 150° C. Specific liquids within this class are benzene, toluene, and the isomeric forms, either singly or in combination, of xylene, with toluene being particularly preferred. Mixtures of these aromatic hydrocarbons may also be used.

In the preparation of the polyurethane resin, the polyester is first dissolved in the aromatic solvent. If the moisture has not been previously removed from the polyester and/or the aromatic solvent, this solution is then dehydrated, such as by distilling the solution into a moisture trap, until all traces of moisture are removed. The required amount of diisocyanate is then added to the solution of polyester as a solution of diisocyanate in anhydrous aromatic solvent. The aromatic solvent falling within the above definition in which the polyester is dissolved and in which the diisocyanate is dissolved separately may be the same or may be different. However, it is preferred that the solvent be the same, since the urethane resin is formed by heating at the reflux temperature of the solution; and having a single solvent simplifies this procedure. To accelerate the reaction between the diisocyanate and polyester, the resulting solution of polyester and diisocyanate in aromatic solvent is heated until the polyester urethane resin is formed. Thereafter, the reaction mass is cooled and diluted to the desired viscosity and solids content by the addition of a liquid polar solvent thereto.

During the addition of the diisocyanate solution to the polyester solution, it is preferred that the polyester solution be at an elevated temperature for the purpose of time, economy and that the diisocyanate solution be added over a period of time. The reaction mixture is thereafter preferably maintained at the reflux temperature of the solution. The end point of the reaction whereby all of the diisocyanate and polyester have been reacted to produce the polyurethane will vary with the reactivity of the polyester toward the diisocyanate. The reaching of a predetermined viscosity by the reaction mass indicates that a polyester urethane of desired molecular weight has been obtained. In laboratory experimentation this is evidenced by the development of bubbles on the surface of the mass. It has been found that refluxing for at least one hour has generally been necessary, and often up to 4 hours has been required. After the end point of the reaction has been reached, the mass is cooled prior to the addition of the polar solvent so as to prevent excessive evaporation of this solvent.

It has been found that strongly polar solvents are effective for diluting the formed polyurethane resin solution. Among such strongly polar solvents are: ketones having a boiling point below 200° C., such as the aliphatic ketones, methyl ethyl ketone, methyl isobutyl ketone, and dibutyl ketone; nitroparaffins such as 2-nitropropane; aliphatic esters such as ethylacetate; and chloroalkylenes such as trichloroethylene. Although it is possible to use as the polar diluent the dimethyl formamide and tetrahydrofuran used by the prior art as the solvent for dissolving polyurethane resins, these materials are not preferred, not only due to their relatively high cost, but also to their disagreeable odor. Of the above disclosed polar liquids, methyl ethyl ketone is preferred. The addition of these polar solvents to the hot solution of polyurethane resin and aromatic solvent has been found necessary to permit cooling of the polyurethane solution to room temperature without the formation of a precipitate or gelation of the resin solution and to maintain the polyurethane solution in a relatively low viscosity, fluid state. The solvent component of the finished urethane resin solution contains from 60 to 85, and preferably about 70, parts by weight of the aromatic hydrocarbon, the remainder being the polar solvent.

By means of the method of the instant invention, solutions containing from 10 to 30% by weight of polyester urethane are produced. These solutions have viscosities depending upon solids content of from 400 to 3000 cps. and preferably about 1500 to 2500 cps. when measured with a Brookfield viscometer at room teperature. These solutions are stable over extended periods of time as to viscosity and solids content, exhibiting no tendency to gel or to precipitate solids.

The solutions of the present invention have utility as compostions for the application of coatings, particularly adhesive coatings. In other words, the instant solutions, because of their stability, may be used in automatic equipment for depositing a layer or film of the polyester urethane solution on a designated portion of a given surface. Thereafter, the solvent is removed therefrom, leaving a solid film of the polyester urethane resin which, upon being sandwiched between another surface and heated, forms a high-strength bond between the two surfaces.

The following examples are by way of explanation only and are not to be construed as a limitation on the invention.

*Example I*

Three hundred grams of polymeric ethylene sebacate having a reactive equivalent weight of 1000 is dissolved by heating in 900 ml. of toluene. The resulting solution is dehydrated by distilling into a moisture trap until all traces of moisture are removed. To this anhydrous solution is added 180 ml. of a solution of 4,4'-diphenylmethane diisocyanate in dry toluene having a concentration of 0.2 g./ml. over a period of 15 minutes. Stirring at reflux is continued until the reaction mixture becomes viscous, as indicated by development of bubbles on the surface. After cooling to 70° C., the reaction mixture is diluted by adding 450 ml. of methyl ethyl ketone. The resulting solution contains 336 g. of polyester urethane resin having an average molecular weight of over 10,000 in 900 g. of toluene and 360 g. of MEK to give a solids content of 21.6%. The solution is stable to storage at room temperature, showing no tendency to gel or precipitate solids. The solid urethane resin, when used as an adhesive between bare metal surfaces, exhibits a peel strength of 50–100 lbs. per 0.75 in.; and when used as an adhesive between coated metal surfaces, exhibits a peel strength of 90–150 lbs. per 0.75 in.

*Example II*

Using the same procedure set forth above, a polyester urethane resin was prepared by reacting in dry toluene a butylene adipate polyester having a reactive equivalent weight of 1091 with 4,4'-diphenylmethane diisocyanate in a mol ratio of 1 to 1. The urethane resin solution, after cooling and dilution with methyl ethyl ketone to a solids concentration of about 18% by weight, was stable to room temperature storage. The urethane resin had an average molecular weight of over 10,000; and a peel strength, when used as a metal-to-metal adhesive, of greater than 50 lbs. per 0.75 in.

A number of solutions containing various concentrations of polyester urethane resins were made in the manner set forth in the examples. Polyesters, coming within the definition therefor set forth hereinbefore, which varied in acid number and reactive equivalent weight were used. Also, the mol ratio of polyester to diisocyanate was varied within the limits set forth hereinbefore.

It is thought that the invention and many of its attendant advantages will be understood from the foregoing description and it will be apparent that various changes may be made in the matter of the ingredients, their identity, and their proportions and in the steps of the process and their order of accomplishment without departing from the spirit and scope of the invention or sacrificing all of its material advantages, the form hereinbefore described being merely a preferred embodiment thereof.

I claim:

1. A composition comprising a stable solution of 10 to 30% by weight of a polyester urethane resin having an average molecular weight of at least 10,000 dissolved in 90 to 70% by weight of a liquid mixture of a mononuclear aromatic hydrocarbon liquid free of aliphatic unsaturation and a strongly polar organic liquid, said urethane resin being the product of the substantially complete reaction between only an aromatic diisocyanate and an aliphatic polyester combined in a ratio of from 0.9 to 1.1 mols of said diisocyanate per mol of said polyester, said polyester being the reaction product of only an aliphatic discarboxylic acid and an aliphatic dihydroxy alcohol in a mol ratio no greater than 0.9 and having an average molecular weight of from 1,500 to 3,000, and said solution having a viscosity at room temperature of from 400 to 3,000 cps.

2. The method of making a stable solution containing a relatively high concentration of a fiber- and film-forming polyester urethane resin comprising providing an anhydrous solution of an aliphatic polyester having terminal hydroxyl groups and an average molecular weight of from 1,500 to 3,000 dissolved in a mononuclear aromatic hydrocarbon free of aliphatic unsaturation, said polyester being the reaction product of only an aliphatic dicarboxylic acid and an aliphatic dihydroxy alcohol in a mol ratio no greater than 0.9 and from which unreacted alcohol has been removed, adding to this solution from 0.9 to 1.1 mols of an aromatic diisocyanate per mol of said polyester dissolved in an anhydrous mononuclear aromatic hydrocarbon free of aliphatic unsaturation, heating the resulting solution to inter-react substantially completely said polyester and said diisocyanate to form a polyester urethane resin having an average molecular weight of at least 10,000, said polyester and said diisocyanate being the sole reactive ingredients forming said urethane resin, cooling the reaction mass to a temperature below the boiling point of a strongly polar organic liquid solvent for said urethane resin and above room temperature, adding said polar liquid to said reaction mass, and further cooling the resulting solution to ambient temperature.

3. The composition in claim 1 wherein said liquid mixture contains from 60 to 85 parts by weight of said aromatic hydrocarbon.

4. The composition set forth in claim 1 wherein said mononuclear aromatic hydrocarbon is selected from the group consisting of benzene, toluene, and xylene.

5. The composition set forth in claim 1 wherein said polar liquid is a nitroparaffin which is liquid at 20° C. and atmospheric pressure.

6. The composition set forth in claim 1 wherein said polar liquid is an aliphatic ketone which is liquid at 20° C. and atmospheric pressure.

7. The composition set forth in claim 6 wherein said ketone is selected from the group consisting of methyl ethyl ketone, methyl isobutyl ketone, and dibutyl ketone.

8. The composition set forth in claim 1 wherein said aliphatic dicarboxylic acid has an alkylene group of from 6 to 10 carbon atoms.

9. The composition set forth in claim 8 wherein said dicarboxylic acid is selected from the group consisting of adipic acid, pimelic acid, suberic acid, azelaic acid, and sebacic acid.

10. The composition set forth in claim 1 wherein said aliphatic dihydroxy alcohol has an alkylene group of from 2 to 4 carbon atoms.

11. The composition set forth in claim 10 wherein said dihydroxy alcohol is a glycol selected from the group consisting of ethylene glycol, propylene glycol, and butylene glycol.

12. The composition set forth in claim 1 wherein said aromatic diisocyanate is selected from the group consisting of tolylene diisocyanate, 4,4'-diphenylmethane diisocyanate, and 1,5-naphthylene diisocyanate.

13. The method set forth in claim 2 wherein said polyester is dissolved in said aromatic hydrocarbon liquid and the resulting solution is dehydrated to a moisture-free condition.

14. The method set forth in claim 2 wherein said resulting solution is heated to the reflux temperature thereof, and is maintained at this temperature until the reaction mass becomes viscous.

References Cited by the Examiner

UNITED STATES PATENTS

| | | | |
|---|---|---|---|
| 2,935,487 | 5/1960 | Fox et al. | 260—75 |
| 2,981,712 | 4/1961 | Harper | 260—75 |
| 3,015,650 | 1/1962 | Schollenberger | 260—75 |
| 3,022,334 | 2/1962 | Frazer. | |

FOREIGN PATENTS

| | | |
|---|---|---|
| 64,914 | 12/1955 | France. |
| | | (1st addition) |
| 579,340 | 7/1946 | Great Britain. |

OTHER REFERENCES

Industrial and Eng. Chem. (Reilly et al.), January 1956, vol. 48, No. 1, pages 59–63.

MORRIS LIEBMAN, *Primary Examiner.*

LEON J. BERCOVITZ, *Examiner.*